(No Model.)
W. J. McGINNISS.
BICYCLE SUPPORT.
No. 578,761. Patented Mar. 16, 1897.
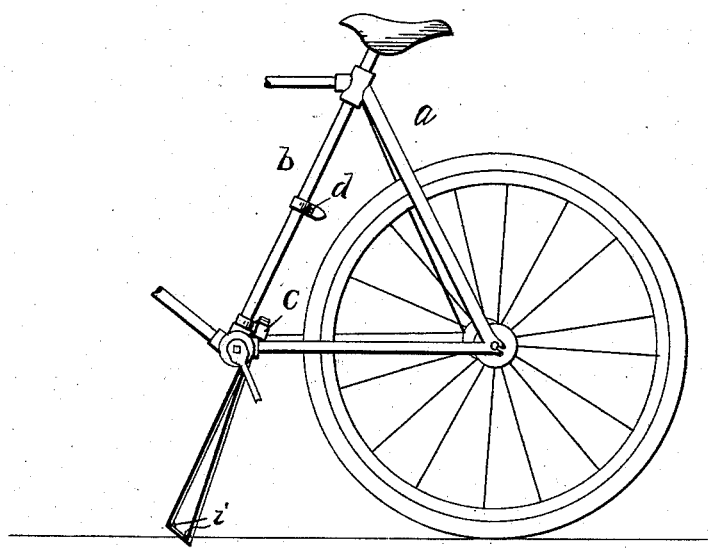
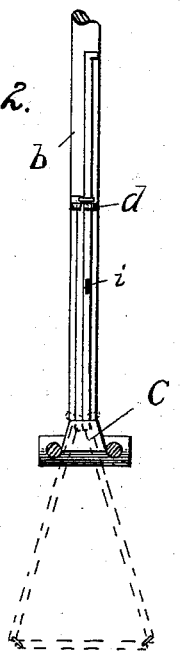
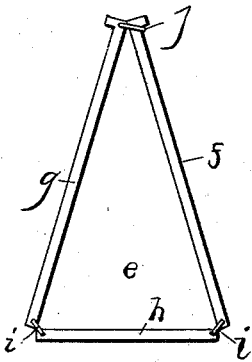
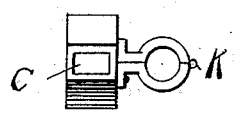
Witnesses
E. E. Duff
Chas. M. Werle
Inventor
W. J. McGinniss
per O. E. Duff
Attorney
THE NORRIS PETERS CO., PHOTO-LITHO., WASHINGTON, D. C.

UNITED STATES PATENT OFFICE.

WILLIAM J. McGINNISS, OF WASHINGTON, DISTRICT OF COLUMBIA.

BICYCLE-SUPPORT.

SPECIFICATION forming part of Letters Patent No. 578,761, dated March 16, 1897.

Application filed May 5, 1896. Serial No. 590,260. (No model.)

*To all whom it may concern:*

Be it known that I, WILLIAM J. McGIN-NISS, of Washington, in the District of Columbia, have invented certain new and useful Improvements in Bicycle-Supports; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain new and useful improvements in bicycle stands or supports.

The object of the invention is to provide a stand that can be carried with the cycle and at all times be ready for use.

A further object of the invention is to provide a stand or support strong, light, and durable, and one that is easy and quick in operation.

A further object of the invention is to provide a stand or support that can be adjusted at any time by the rider.

A further object of the invention is to provide a stand or support carried by the machine out of the way of the rider and easily operated thereby.

In the drawings, Figure 1 shows a portion of a bicycle with the support lowered. Fig. 2 shows my improved stand folded against the center post of the machine and in dotted lines lowered. Fig. 3 is a side elevation of the stand detached. Fig. 4 is a top plan view of the cone or conical fastening, and Fig. 5 is a similar view showing a modified form of attaching the cone to the machine.

Referring to the accompanying drawings, $a$ is the frame of a bicycle, and $b$ the center post, carrying the cone $c$ and spring-clasp $d$. Movable in said cone a triangular frame $e$ works. This frame is composed of the two legs $f$ and $g$ and the base $h$, united by any suitable flexible means, such as hinges $i$, as shown. The legs $f$ and $g$ are headed at their upper ends, and one is provided with a yoke or collar $j$.

As is shown, the upright leg $g$ carries the collar, through which the leg $f$ freely moves a limited distance. It will be observed that the legs and base forming the support work freely in the conical fastening. The heads are formed on one side of the upper ends of the legs, so that when the legs and base slide together the heads do not interfere.

The conical fastening being secured to the bicycle, the support is slipped through it, and when down the legs and base form a triangle, the cycle resting on the said conical fastening. When the support is to be folded and screwed to the frame, the free leg slides up through the hollow cone, then the base follows, and when end to end they form one continuous piece, which is readily secured to the frame without in any manner interfering with the operation of the machine or its rider.

When it is desired to lower the stand or support, it is only necessary to release the heads of the legs $f$ and $g$ from the clamp $d$. The stand will then drop to its supporting position. The cone may be located on the central post of the machine between the rear bars, as shown in Fig. 5.

Should it be desired to attach this stand to a cycle after the same has been built, the construction shown in Fig. 4 could be employed. In this construction it will be seen that a swivel is used to attach the cone to the central post. One side of said swivel can be rigidly attached to or integral with the cone, while the other side may be hinged, as at $k$, and fastened to said cone by any suitable means. When the frame is dropped to its supporting position, the base $h$ spreads and holds apart the legs $f$ and $g$, the weight of the machine wedging said legs in the cone $c$. Thus it will be seen that a support is provided simple in construction and operation and made of a minimum number of parts and exceedingly light and strong.

It is evident that various slight changes might be made in the forms, constructions, and arrangements of the parts described without departing from the spirit and scope of my invention.

Having thus fully described my invention, what I claim as new, and desire to secure by Letters Patent of the United States, is—

1. A stand or support for cycles composed of a cone or socket, the headed legs and the base loosely joined to said legs for the purpose set forth.

2. A portable cycle-support composed of the cone-shaped socket, the hinged triangular frame composed of the headed legs and a base, substantially as set forth.

3. In a support for bicycles the combination of a hinged frame having headed legs, one of said legs carrying a yoke or collar and adapted to hold the frame in a triangular position and a base flexibly attached to said legs for the purposes set forth.

In testimony that I claim the foregoing as my own I affix my signature in presence of two witnesses.

W. J. McGINNISS.

Witnesses:
  E. C. DUFFY,
  C. M. WERLE.